(12) United States Patent
Moehring

(10) Patent No.: US 7,677,806 B2
(45) Date of Patent: Mar. 16, 2010

(54) BEARING ELEMENT

(75) Inventor: Keven Moehring, Wiedergeltingen (DE)

(73) Assignee: IMS Gear GmbH, Eisenbach (DE)

( * ) Notice: Subject to any disclaimer, the term of this patent is extended or adjusted under 35 U.S.C. 154(b) by 1106 days.

(21) Appl. No.: 11/244,400

(22) Filed: Oct. 6, 2005

(65) Prior Publication Data

US 2006/0078241 A1 Apr. 13, 2006

(30) Foreign Application Priority Data

Oct. 7, 2004 (DE) .................. 10 2004 049 105

(51) Int. Cl.
*F16C 17/04* (2006.01)
*F16F 1/34* (2006.01)

(52) U.S. Cl. .................. 384/243; 384/240; 384/420; 267/161

(58) Field of Classification Search .................. 384/240, 384/243, 420, 425; 267/151, 158, 160, 161
See application file for complete search history.

(56) References Cited

U.S. PATENT DOCUMENTS

| 2,747,166 | A | * | 5/1956 | Hoffarth | .................. | 439/884 |
|---|---|---|---|---|---|---|
| 2,938,755 | A | * | 5/1960 | Lee et al. | .................. | 384/204 |
| 2,960,301 | A | * | 11/1960 | Roman | .................. | 267/134 |
| 3,754,802 | A | | 8/1973 | Keller | | |
| 3,790,237 | A | | 2/1974 | Quaile et al. | | |
| 3,942,848 | A | | 3/1976 | Voumard | | |
| 4,387,790 | A | | 6/1983 | Yasumatsu et al. | | |
| 5,735,716 | A | * | 4/1998 | Bilezikjian | .................. | 439/843 |
| 2008/0282697 | A1 | * | 11/2008 | Klimes | .................. | 60/562 |

FOREIGN PATENT DOCUMENTS

| DE | 911 684 | 5/1954 |
|---|---|---|
| DE | 1 027 470 | 9/1954 |
| DE | 2 262 275 | 7/1973 |
| DE | 2 302 946 | 8/1973 |
| DE | 28 03 262 | 8/1979 |
| DE | 38 28 609 A1 | 3/1990 |
| DE | 88 12 071.6 U1 | 3/1990 |
| DE | 196 02 926 | 5/1997 |
| DE | 199 20 629 | 11/2000 |
| DE | 100 53 797 | 5/2002 |
| DE | 199 20 629 C2 | 8/2003 |
| FR | 1 228 232 | 8/1960 |
| GB | 1 117 220 | 6/1968 |

\* cited by examiner

*Primary Examiner*—Thomas R Hannon
*Assistant Examiner*—Phillip Johnson
(74) *Attorney, Agent, or Firm*—The Nath Law Group; Jerald L. Meyer; Robert T. Burns

(57) ABSTRACT

1. Bearing element (4) for a bearing for borne supporting of a bearing counter-element (2), whereby the bearing element (4) has
  a bearing segment (40) at which the bearing counter-element (2) is supportably borne with a force component (F) in the direction of the bearing segment (40), and,
  at least one positioning segment lateral to the bearing segment (40) for positioning the bearing element (4) at a wall (32) of the bearing for fixing and/or orienting the bearing element (4) in the bearing, whereby aligning and/or support elements (41, 42) project laterally from the bearing segment (40), whereby the aligning and/or support elements (41, 42) are physically distanced from each adjacent aligning and/or support element (41, 42), and whereby the aligning and/or support elements (41, 42) distanced from the bearing segment (40) each embody at least one positioning segment (43, 44).

12 Claims, 5 Drawing Sheets

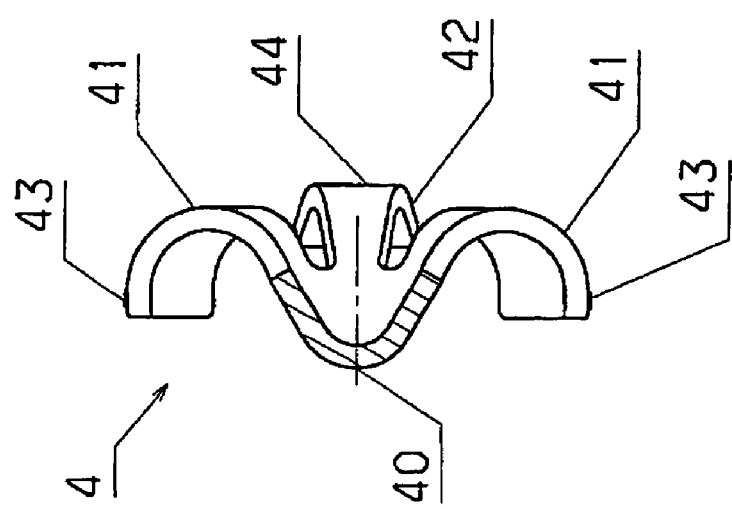
Fig. 4 (A-A)
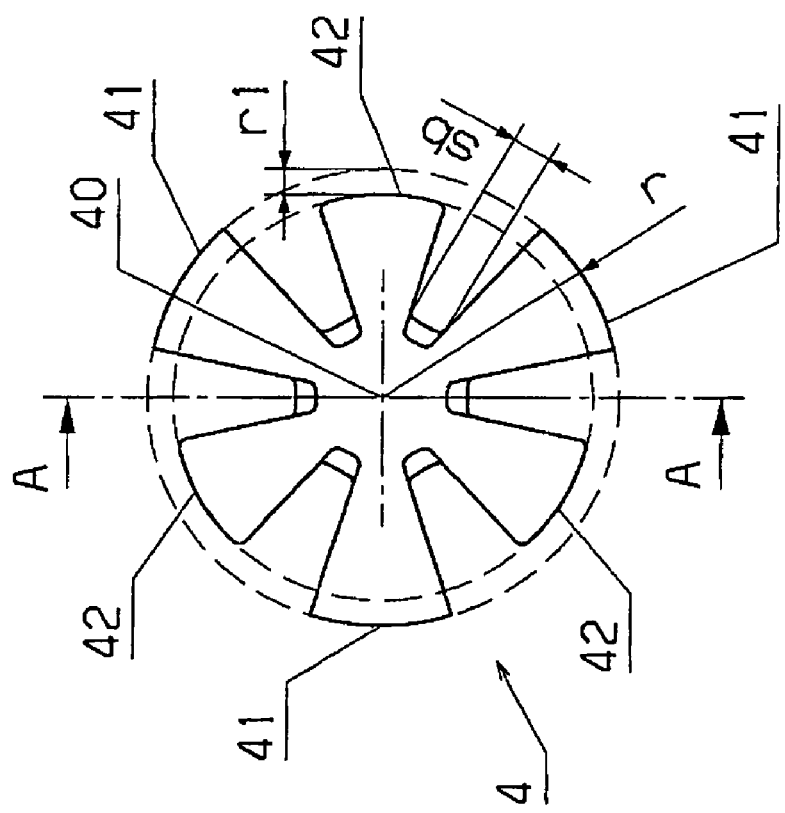
Fig. 3

BEARING ELEMENT

The invention relates to a bearing element with the features in the preamble to patent claim 1 and to a bearing with such a bearing element.

Known generally is an arrangement for play-free axial bearing of a power train, e.g. of an axis or shaft. Embodied in a wall that runs on the end face of such a shaft transverse to the axis direction of the shaft is an opening in which a pot-shaped container with a side wall and a floor are placed. Arranged on the floor is a thrust ring that offers low wear and material flexibility with respect to a steel ball. The steel ball is arranged between the thrust ring and an end-face ball receiving element of the shaft so that power is transmitted from the shaft in the axial direction via the ball to only a smallest possible bearing segment or bearing point of the thrust ring. This leads to minimizing friction using a concentrated load. The side wall of the pot-shaped container is arranged displaceable in the axial direction in the opening of the wall of the housing so that the end face of the shaft can be acted upon with a corresponding initial stress by screwing in the pot-shaped container appropriately. Spaced apart from the end-face bearing arrangement of the shaft, the shaft leads through a sleeve bearing that is inserted especially in another wall of the housing so that the shaft is physically fixed in the axial direction. The shaft is acted upon with additional components, for instance a shaft spring lock washer relative to the second wall of the housing in the direction of the first bearing with the thrust ring with an initial stress.

Such a bearing element thus includes a bearing segment at which the bearing counter-element, for instance a drive shaft, is supportably borne with a force component in the direction of the bearing segment. In addition, the bearing element includes at least one positioning segment lateral to the bearing segment for positioning the bearing element at a wall of the bearing for fixing and/or orienting the bearing element in the bearing. The wall of the bearing is embodied by a bore-shaped or pot-shaped opening in a housing wall. In such a case, the bearing segment is embodied by a flat disk, the front side of which is embodied centrally with a segment for supporting the bearing counter-element and its lateral circumferential wall and back side are embodied for corresponding positioning at walls of the pot-shaped opening in the bearing.

The object of the invention is to suggest an alternative bearing element that makes it possible to dispense with the complex structure with a steel ball and a thrust ring.

This object is attained with a bearing element with the features of patent claim 1 and with a bearing with the features of patent claim 11.

Accordingly, preferred is a bearing element for a bearing for borne supporting of a bearing counter-element, whereby the bearing element has a bearing segment at which the bearing counter-element is supportably borne with a force component in the direction of the bearing segment, and at least one positioning segment lateral to the bearing segment for positioning the bearing element at a wall of the bearing for fixing and/or orienting the bearing element in the bearing, whereby aligning and/or support elements project laterally from the bearing segment, whereby the aligning and/or support elements are physically distanced from each adjacent aligning and/or support element, and whereby the aligning and/or support elements distanced from the bearing segment each embody at least one positioning segment.

Lateral to the bearing segment does not necessarily mean lateral to the longitudinal axis, in particular not perpendicularly lateral to the longitudinal axis, of a shaft as counterbearing element, but rather means lateral to the actual circumference of the central bearing segment of the bearing element. The dimensioning of the body of the central bearing section depends on a variety of factors, in particular the required elasticity.

Advantageous embodiments are the subject of dependent claims.

Particularly advantageous is a bearing element in which at least the aligning and/or support elements comprise a resiliently elastic material.

Particularly advantageous is a bearing element in which at least a portion of the aligning and/or support elements are shaped from the bearing segment out such that their positioning segment can be arranged adjacent to a side wall and supported at the side wall, in particular can be arranged adjacent to and supported under stress. The bearing segment is arranged lateral to the bearing segment. The side wall is in particular arranged parallel to the force component in the direction of the bearing segment and distanced from the bearing segment as the wall of the bearing.

Particularly advantageous is a bearing element in which at least a portion of the aligning and/or support elements arc out from the bearing segment such that their positioning segment can be arranged adjacent to a back side wall and supported at the back side wall, in particular can be arranged adjacent to and supported under stress. The back side wall is arranged on the back side of the bearing segment opposing the front side bearing counter-element and distanced from the bearing segment as wall of the bearing.

Particularly advantageous is a bearing element in which the aligning and/or support elements embodied for supporting at the side wall extend further in the direction of the side wall than the aligning and/or supporting elements embodied for supporting at the back side wall.

Particularly advantageous is a bearing element in which the aligning and/or support elements embodied for supporting at the back side wall extend further in the direction of the back side wall than the aligning and/or support elements embodied for supporting at the side wall.

Particularly advantageous is a bearing element in which the aligning and/or support elements arc such that they run parallel to the wall of the bearing in the area of their positioning segment.

Particularly advantageous is a bearing element in which the aligning and/or support elements run from the positioning segment out in a direction leading away from the bearing counter-element with at least one partial direction component of the force component of the bearing counter-element.

Advantageous is, in particular, a bearing element in which the positioning segment is convex, in particular at least partially spherical, in the direction of the bearing counter-element.

Particularly advantageous is a bearing element in which the aligning and/or support elements extend across an area that is parallel to the side wall and that is not only point-shaped or linear. This embodiment thus concerns a preferably largely pot-shaped bearing element in which the aligning and/or support elements from the point of view of the bearing counter-element first extend forward away from the bearing segment and then lead laterally back in an arc into a lateral area of the bearing counter-element.

Particularly advantageous is a bearing element in which an elastic element, in particular an annular elastic element, is arranged opposite a positioning surface of the positioning segments of the aligning and/or support elements for clamping the positioning segments against the side wall of the bearing.

Particularly advantageous is a bearing element in which fixing elements for mutually engaging corresponding fixing elements are embodied on the wall of the bearing. In particular the fixing elements are arranged in the area of a positioning segment or adjacent thereto. The elements should preferably, in particular do not absolutely have to, mutually engage. The number can also be greater than or less than 3 per side. Furthermore the opposing walls do not necessarily have to have corresponding elements.

Particularly advantageous is a bearing element in which the bearing segment and the aligning and/or support elements are embodied in a single piece.

Particularly advantageous is a bearing for supported bearing of a bearing counter-element with such a bearing element and with a wall, in particular a bore-shaped and/or pot-shaped wall, for embodying or receiving a receiving opening of the bearing for fixing and/or orienting the bearing element in the bearing, whereby the bearing element is clamped with auto-orientation with its aligning and/or support elements in the lateral direction from the point of view of a force component of the bearing counter-element in the direction of the bearing element between the walls and/or clamped with auto-orientation in the support direction of the bearing counter-element between the bearing counter-element and a floor-shaped wall of the wall of the bearing.

Particularly advantageous is a bearing element or bearing with an axis or shaft as bearing counter-element, whereby the axis or shaft is to be supported or is supported on the end face in the axial direction at the bearing segment.

In accordance with preferred embodiments, the counter-bearing element is an axis or a rotating shaft or a shaft that can be caused to rotate. Other physical shapes can also be used for the bearing counter-element, however. Particularly preferred is use in vehicle engineering for bearing a power train in order to convert play-free or the most play-free possible axial bearing for instance of a gear to steering column displacement.

The bearing element preferably comprises a single-piece body, but may constitute a plurality of individual components, for instance that have been welded together. The actual bearing segment to which the bearing counter-element is adjacent in particular as a shaft is preferably spherical in order to reduce the contact surface and thus the frictional surface. The positioning segments correspond to the areas in which the bearing element is adjacent to a wall of the bearing and correspond in the prior art to the circumferential surface and to the floor surface of the bearing element, which are adjacent to a side wall or floor of the bearing. Walls of the bearing mean general walls that are not necessarily limited to large surface area walls. Where needed, the wall can also comprise a bore with small dimensions or a contacting projection or the like.

In the case of a shaft or axis as bearing counter-element and a spherical bearing segment, the orientation advantageously means that the force component of the bearing counter-element coincides with the axis of rotation or longitudinal axis of the shaft or axis and acts in the axial direction on the bearing element. It is possible to clamp the bearing element between side walls in that the exterior circumference of the bearing element in the lateral direction is greater than the interior circumference of the bearing opening into which the bearing element is then inserted with initial stress. However, it is also possible to use a bearing element with the same or a smaller exterior circumference than the interior circumference of the bearing opening for receiving the bearing element if the bearing element is clamped by the force component from the direction of the front side of the bearing segment on the one hand and by a further clamping element, for instance the floor of the bearing, so that due to the elastic property of the material the aligning and/or support elements of the bearing element expand in the lateral direction.

The aligning and/or support elements are physically spaced from one another, which means for example that a gap or slot is embodied between them. However, in accordance with one preferred embodiment, a wide distance is used. What is important ultimately is that the aligning and/or support elements that are adjacent to one another are not directly securely joined to one another, but rather indirectly via the bearing segment or a central segment of the bearing element that includes the bearing segment.

If the individual components of the bearing element arc or do not run in a straight line, a flat course in the mathematical sense is preferred. In principle, however, graduated surfaces and contours with edges can also be used if these facilitate the functionality and the elastic effect of a flat arced course for the purpose of aligning and/or clamping the bearing element in a bearing opening for receiving the bearing element. Such contours should also be understood as arced.

One exemplary embodiment and alternative embodiments are described in more detail in the following using the drawings:

FIG. 2-4 are various elevations of such a bearing element in accordance with a preferred embodiment;

Figure 1:
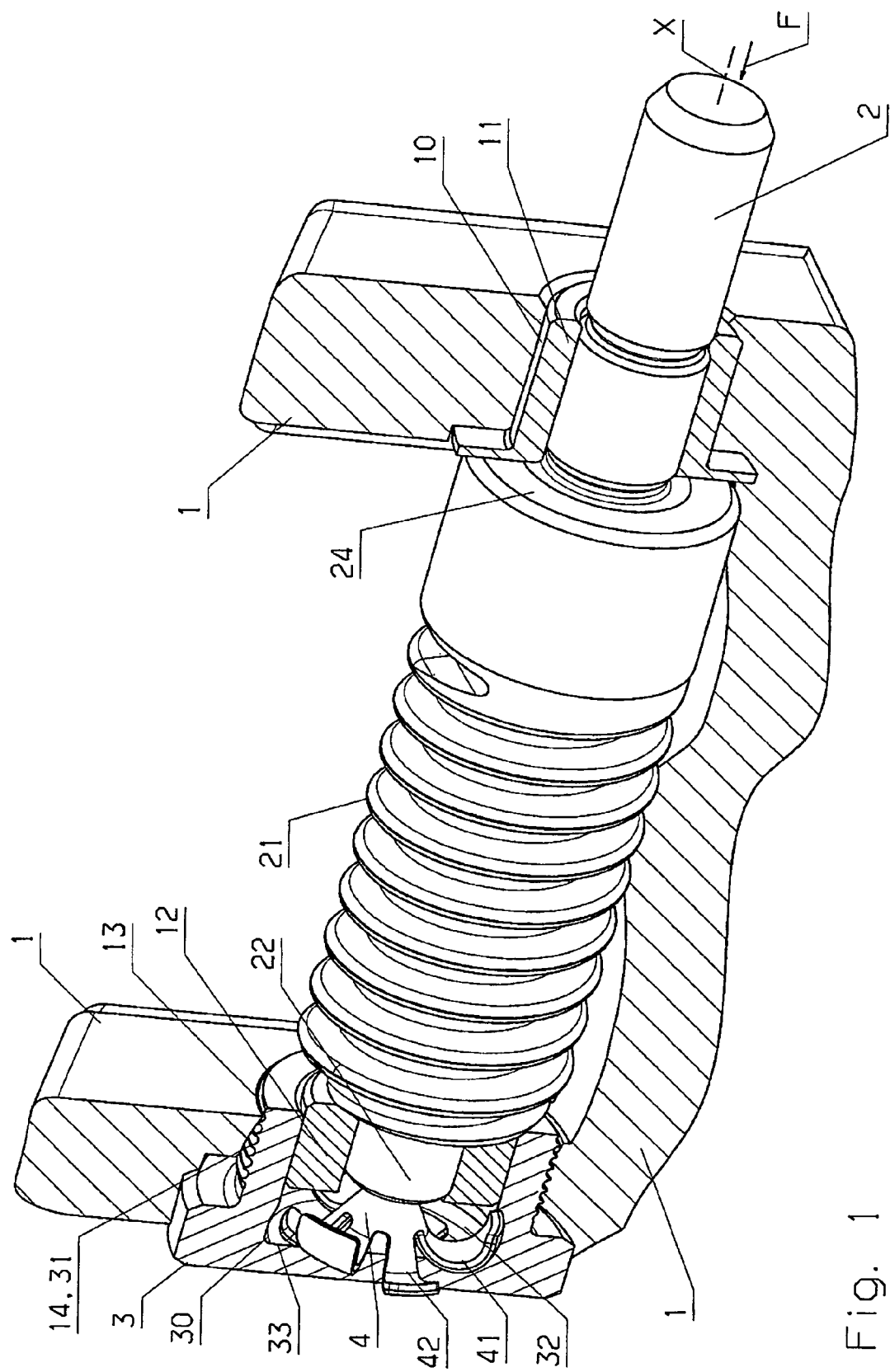
FIG. 1 is a shaft that is in a housing and that is borne axially on the end face with a bearing element.

FIG. 1 illustrates a partial cut-away view of a bearing arrangement. Illustrated are two bearing walls 1 of a larger device, in which a bearing counter-element 2, in particular as illustrated an axis or shaft 2 is preferably borne play-free. For instance in the case of an axis or shaft 2 it is a power train.

From the right-hand side of the drawing, the shaft 2 leads through a bearing bush 11 that is borne in a bearing receiving opening 10 of the first bearing wall 1. The shaft 2 leads in the direction of the second bearing wall 1 through a screw 21, whereby the screw 21 and the shaft 2 are securely joined to one another so that a rotation of the shaft 2 can be transferred to the screw 21 and/or conversely a rotation of the screw 21 can be transferred to the shaft 2. Projecting from the left-hand end of the screw 21 in the drawing is an end-face end segment 22 of the shaft that has an end-face surface as an end-face shaft bearing 23, which can be seen in FIG. 2. The end-face end segment 22 of the shaft 2 is borne in another bearing bush 12, whereby the end-face end segment 22 of the shaft 2 does not necessarily extend all the way through the bearing bush 12 or even project out of it.

The bearing bush 12 is itself received in an adjusting element 3, and in particular is arranged in the adjusting element 3 rotation-fast and play-free in the radial direction from the point of view of the shaft 2. The adjusting element 3 embodies a receiving opening 30 for receiving, among other things, the bearing bush 12. In addition, the adjusting element 3 on its exterior is received in a bearing receiving opening 13 that is embodied in the second bearing wall 1.

The adjusting element 3 has an exterior thread 31 that engages in an interior thread 14 of the bearing receiving opening 13 so that the adjusting element 3 can be screwed as far as appropriate into the second bearing wall 1 in the axial direction of the shaft 2.

The adjusting element 3 is embodied largely in a pot-shape so that the receiving opening 30 of the adjusting element 3 has a circumferential side wall 32 and a floor 33. The bearing bush is received in the front segment of the side wall 32, i.e. in the direction of the shaft 2 or of the first bearing wall 1. Between the front segment of the receiving opening 30 with the bearing bush 12 and the shaft 2 received therein on the one hand and on the other hand the front floor 33 of the adjusting element 3 is an open space in which is arranged a bearing element 4 for end-face bearing and supporting of the end-face axis bearing 23 of the shaft 2.

The bearing element 4 comprises an elastic material, in particular resiliently elastic material, and is clamped between the end-face shaft bearing 23 of the shaft 2 and the floor 33 using mechanical stress. The stress can act by applying a force component F of the shaft 2 in the direction of its end-face shaft bearing 23 on the bearing element 4. In accordance with the illustrated embodiment, however, the adjusting element 3 is preferably screwed into the bearing receiving opening 13 in the direction of the end-face shaft bearing 23 of the shaft 2. This clamps the bearing element 4 from the floor 33 of the adjusting element 3 against the end-face shaft bearing 23. In order to build up counter-stress, the end of the screw 21 that faces away from the end-face shaft bearing 24, for instance, embodies a shaft counter-bearing 23 that is preferably borne friction-free along the side wall of the bearing wall 1 that [side wall] faces the end-face shaft bearing 23. What is ultimately important, however, is only that the end-face shaft bearing of the shaft 2 is appropriately arranged as a bearing counter-element and where required is clamped by the shaft 2 in the axial direction of a shaft axis X.

Figure 2:
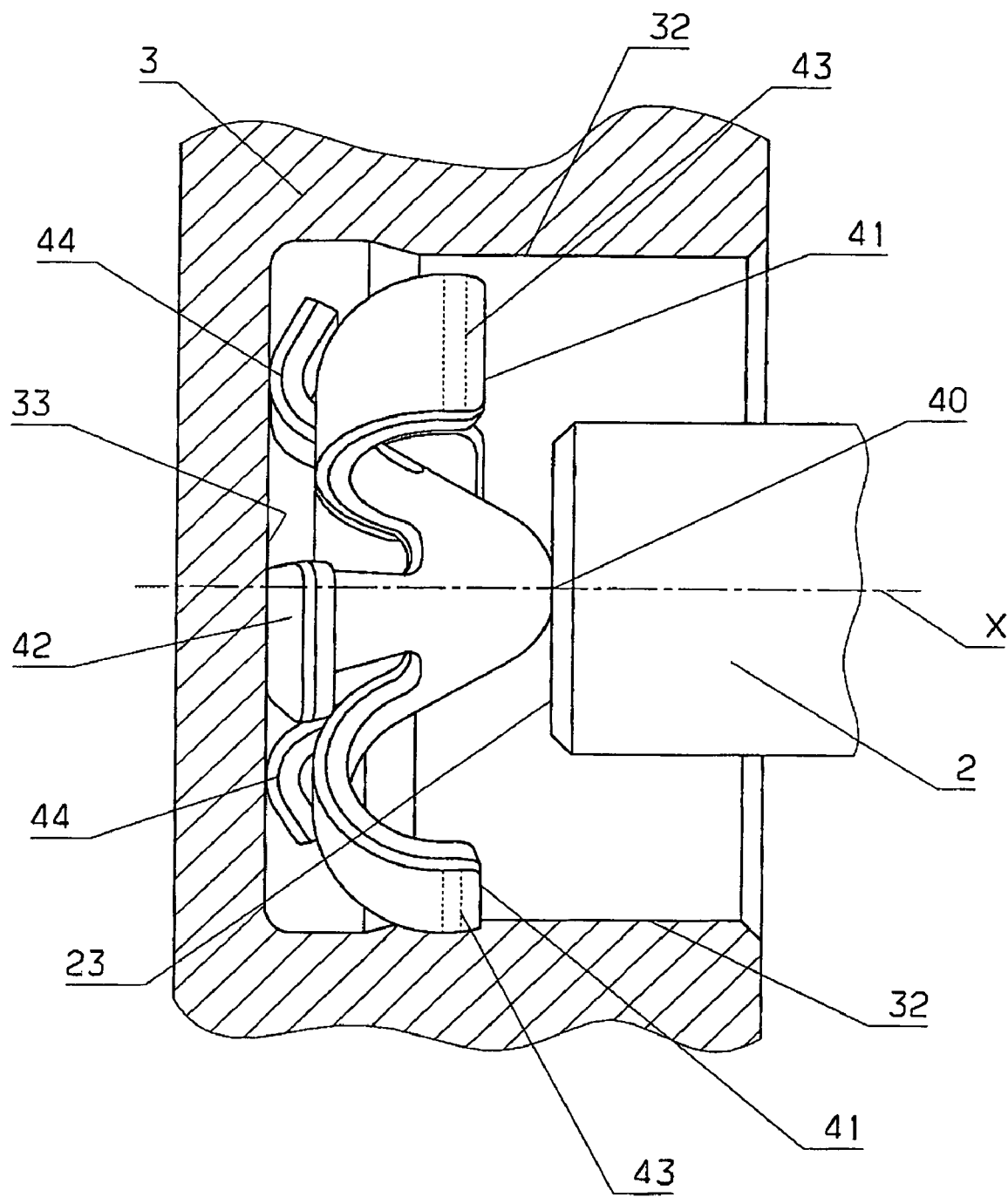

As can be seen from FIGS. 2-4, the bearing element 4 preferably comprises a single-piece body with a central bearing segment 40 and aligning and/or support elements 41, 42 that project laterally therefrom. The central bearing segment 40 is preferably convex in the direction of the shaft 2, in particular spherical, so that between the bearing segment 40 and the end-face shaft bearing 23 there is a preferably only small, in particular point-like contact surface that applies to the shaft 2 the least possible friction in terms of the fixed bearing element 4 when the shaft 2 rotates. The bearing element 4 thus preferably comprises on the one hand an elastic material and on the other hand a wear-resistant or wear-fast coated or cured material.

In the particularly preferred embodiment of the bearing element 4, the latter has two different types of aligning and/or support elements 41, 42. The first aligning and/or support elements 41 support and simultaneously preferably automatically align the bearing element 4 to the side walls 32 of the adjusting element 3. The second aligning and/or support elements 42 support and preferably automatically align the bearing element 4 with regard to the floor 33 of the adjusting element 3. However, in principle other embodiments can be used in which the bearing element 4 has only the first or only the second such aligning and/or support elements 41, 42.

In particular in embodiments with a bearing element 4 that has only the first aligning and/or support elements 41 for support at a side wall 32, the use of an adjusting element 3 can also be dispensed with so that the side wall 32 is embodied directly for instance by the bearing receiving opening 13 in the second bearing wall 1. Embodiments are also possible in which in the second bearing wall 1 a pot-shaped bore is inserted in which the second aligning and/or support elements 42 are supported at a corresponding floor corresponding to the floor 33 of the adjusting element 3 likewise without the use of such an adjusting element 3.

The aligning and/or support elements 41, 42 project out from the edge of the bearing segment 40 in the lateral direction, whereby they are arced. Arced does not necessarily mean a contour with a constant radius, but rather merely a course that in accordance with the preferred embodiment can be obtained by simply shaping a workpiece that was originally flat. In particular an arced shape offers particularly good elastic properties compared to a course with very sharp edged contours transverse to the longitudinal direction of the aligning and/or support elements 41, 42. In an area facing away from the bearing segment 40, the aligning and/or support elements 41, 42 each have at least one positioning segment 43 and/or 44. The positioning segments 43, 44 can be embodied by a point-like, linear, or flat surface segment of the aligning and/or support elements 41, 42. The positioning segments 43, 44 are for positioning and supporting the aligning and/or support elements 41, 42 on the side wall 32 or on the floor 33 of the receiving opening 30 of the bearing.

From the point of view of the shaft axis X of the exemplary shaft 2, the first, laterally oriented aligning and/or support elements 41 in the area of their positioning segments 43 embody a lateral extension of the bearing element 4 in the radial direction with a radius r that is preferably greater than the interior radius of the receiving opening 30. This is how the bearing element 4 is elastically deformed when inserted so that the first aligning and/or support elements 41 are placed under initial stress at the side wall 32 of the receiving opening 30.

Preferably the radius of the lateral extension of the second aligning and/or support elements 42 is less than the radius r of the radial extension of the first aligning and/or support elements 41 by a radius difference r1.

In the axial direction of the shaft 2, the first aligning and/or support elements 41 extend preferably by a difference x1 less in the axial direction than the second aligning and/or support elements 42, which are supported in the axial direction, or from the point of view of the shaft 2 in the front direction, on the floor 33.

Particularly preferred is such a bearing element 4 with three or where required more of each of the first and second aligning and/or support elements 41, 42, since such an arrangement makes possible not only secure elastic support of the bearing element 4 in the receiving opening 30 but also automatic independent alignment of the bearing element 4 in the receiving opening 30.

Spacing between each of the adjacent aligning and/or support elements 41, 42 can in principle be minimal, i.e., for instance can be embodied by a gap. However, in accordance with initial trials, preferred are spacings with a spacing width sb greater than a gap [sic] and in particular with a spacing width sb of the transition width of the individual aligning and/or support elements 41, 42 to the bearing segment 40.

In accordance with the preferred embodiment, such a bearing element 4 is advantageous in particular with regard to the dual three-fold self-centering orientation in the receiving opening during assembly. This makes possible a bearing system in which the bearing counter-element, in particular the end face or the end-face shaft bearing 23 of a rotating shaft 2 is also held play-free under a changing load direction. In addition, this embodiment enables the friction to be minimized due to the concentrated load in the central segment of the bearing segment 40. Appropriate material selection or material processing makes possible wear-free operation. Automatic alignment occurs both in the lateral and in the axial direction.

Made possible in particular is a bearing arrangement without the use of a steel ball and a hardened thrust ring, whereby it is also possible to dispense with a correspondingly embodied end face with a receiving basin for a steel ball in the shaft 2.

During the assembly of an arrangement in accordance with FIG. 4, for example a sleeve bearing in the form of the bearing bush 11 is placed in the bearing receiving opening 10 of the first bearing wall 1, then an axial bearing, in particular ball bearing, and the shaft counter-bearing 24, is placed on the shaft from the right up to the screw 21 before the shaft 2 is placed through the bearing bush 11 from the left. Then the bearing bush 12, as an additional sleeve bearing, is placed on the end-face end segment 22 of the shaft 2, the bearing element 4 is placed in the receiving opening 30 of the adjusting element, and finally the adjusting element 3 is placed into the bearing receiving opening 13 of the second bearing wall 1. The adjusting element 3 is inserted by screwing it in, whereby the bearing element 4 with its second aligning and/or support elements 42 and its bearing segment 40 situated opposed thereto are clamped to the desired degree between the floor 33 of the adjusting element 3 and the end-face shaft bearing 23 of the shaft 2.

Finally the bearing element 4 assumes three functions that are foreign to the components, so that the complexity of assembly and the number of elements to be assembled for a corresponding power train are clearly minimizable. The bearing segment 40 is preferably embodied spherically and forms a replacement for an otherwise conventional steel ball while minimizing the sliding friction with a concentrated load. The lateral aligning and/or support elements 41 act as arms for centering and clamping the bearing element 4 in the adjusting element 3. Three arms facilitate particularly good centering and simultaneously offer an anti-rotation function using a corresponding initial radial stress that can be attained by oversizing the centering arms/aligning and/or support elements 41. The oversizing is in particular embodied by an extension of the aligning and/or support elements 41, 42 via the positioning segments 43 or 44 in the outward direction of the aligning and/or support elements 41, 42. Finally, a functional surface is formed like a type of circular arc segment for centering and clamping the bearing element 4. The second aligning and/or support elements 42 replace an otherwise conventional spring lock washer and offer improved resilience in the axial direction, i.e. in the direction of the force component F. The dimensioning of the transition of the aligning and/or support elements 41, 42 to the bearing segment 40 embodies a functional surface that affects the resiliency. Using a change in cross-section in particular, but also for instance width, material strength, and elastic property, for instance spring steel quality, the resiliency can be variably adapted to the requirements for the special bearing element 4.

Figure 5:
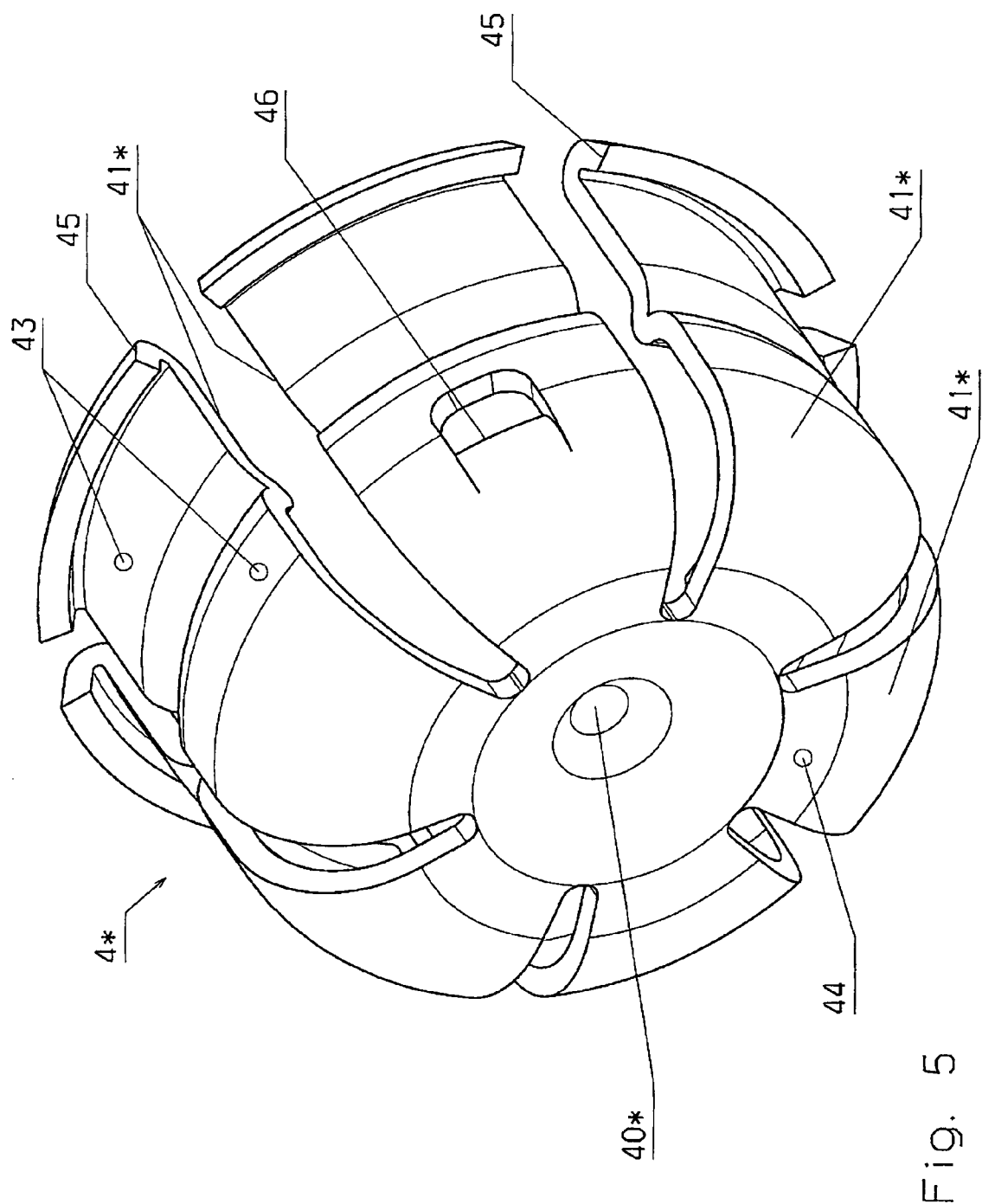
FIG. 5 is a bearing element in accordance with an alternative embodiment.
Figure 6:
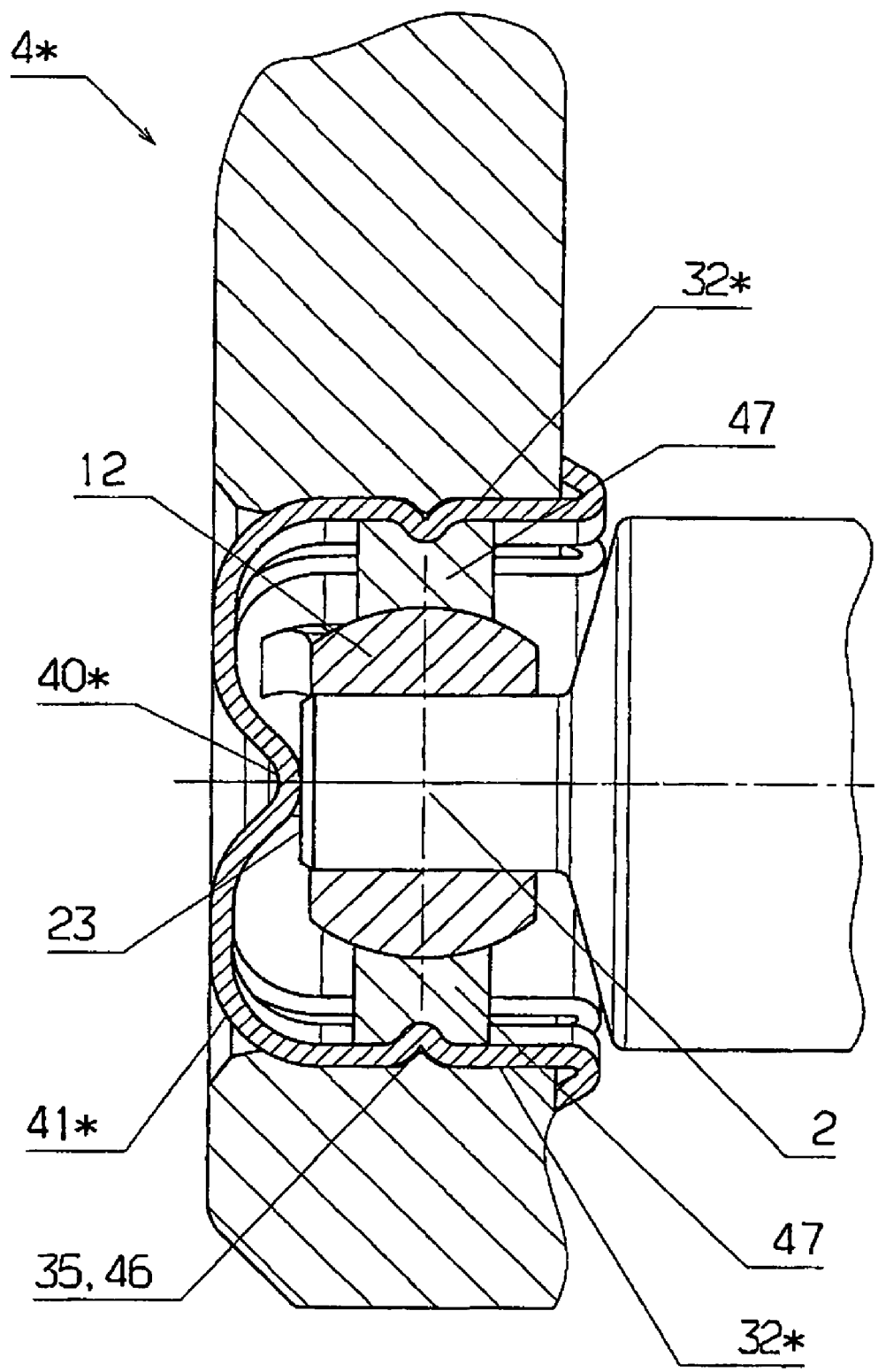
FIG. 6 is the bearing element in accordance with FIG. 5 inserted in a housing wall.

In accordance with the second embodiment, which is illustrated using FIGS. 5 and 6, the bearing element 4* has a pot-shaped structure with a bearing segment 40* that is arched toward the interior of the pot, rather than a calyx-like structure. In this arrangement, the aligning and/or support elements illustrated in FIG. 2 extend backwards in the axial direction and embody the aligning and/or support elements 41* that are adjacent to the side wall 32* over a large surface.

Advantageously, embodied in the edge of and/or in some other area of the aligning and/or support elements 41* that is active with respect to the side wall 32* and where necessary to a floor 33 are fixing elements 45, 46 that engage in corresponding counter-fixing elements 35 of the side wall 32*. The fixing elements 45, 46, 35* can be embodied in the conventional manner point-like, linearly, or as a surface. For instance the fixing elements 45, 46, 35* can be embodied as projections, notches, circumferential walls, or hooks.

For reinforcing the holding or pressing force of the lateral aligning and/or support elements 41* at the side wall 32*, preferably arranged on the interior of the aligning and/or support elements 41* is an elastic element 47, in particular an annular elastic element 47, that exerts a force that acts radially outward on the aligning and/or support elements 41*. The fixing elements can in particular also run in the form of an annular slot or annular bulge along the aligning and/or support elements 41*.

A bearing element 4* in accordance with the second embodiment in particular makes it possible to dispense with an adjusting element 3, whereby the bearing element 4* can be placed directly in a bore-shaped or pot-shaped bearing receiving opening 13 of the bearing or of the second bearing wall 1. The individual aligning and/or support elements are again positioned at the side walls 32* and where necessary at a corresponding floor. In particular the shape of such a bearing element 4* as a component makes possible a correctly positioned connection in a bearing receiving opening 13 as well as with regard to a bearing counter-element such as the shaft 2. When fixing elements are provided, the assembly of the bearing element 4* occurs in particular by snapping or locking in a desired position in the bearing. In particular incorrect positioning of the bearing element 4* can be prevented by stops as fixing elements. Integrated hooks, in particular integrated hooks arranged radially on the bearing element 4* can also be embodied such that these act like a barb. Positioning of the bearing element 4* is thereby even more flexible and the bearing element 4* is even less dependent on tolerances in terms of assembly.

The invention claimed is:

1. A bearing element for a bearing for borne supporting of a bearing counter-element, comprising:
    a bearing segment at which said bearing counter-element is supportably borne with an axial force component in the direction of said bearing segment;
    at least one positioning segment lateral to said bearing segment for positioning said bearing element at a lateral side wall of said bearing for fixing and/or orienting said bearing element in said bearing; and
    support elements projecting laterally from said bearing segment, said support elements being physically distanced from each nonadjacent support element, and said support elements being distanced from said bearing segment, each embodying at least one positioning segment,
    wherein said support elements include a first group of support elements that are shaped from said bearing segment extending outward out, such that their positioning segment is arranged adjacent to said lateral side wall and structurally supported at said lateral side wall, said lateral sidewall being arranged to said bearing segment and distanced from said bearing segment,
    wherein said support elements include a second group of support elements that arc outward from said bearing element such that their positioning segment can be arranged adjacent to a back side wall and supported at said back side wall, said back side wall is arranged on the back side of said bearing segment opposing a front side of said bearing counter element and distanced from said bearing segment, and wherein said first group of support elements embodied for structurally supporting at said back side wall extend axially further in the direction of said back side wall than said second group of support elements embodied for structurally supporting at said lateral side wall.

2. The bearing element in accordance with claim 1, wherein at least said support elements comprise a resiliently elastic material.

3. The bearing element in accordance with claim 1, wherein said positioning segment can be arranged parallel to said force component in the direction of said bearing segment, and distanced from said bearing segment.

4. The bearing element in accordance with claim 1, wherein said support elements embodied for supporting at said side wall extend further in the direction of said side wall than said supporting elements embodied for supporting at said back side wall.

5. The bearing element in accordance with claim 1, wherein said support elements are such that they run parallel too said wall of said bearing in the area of their positioning segment.

6. The bearing element in accordance with claim 1, wherein said support elements run from said positioning segment out in a direction leading away from said bearing counter-element with at least one partial direction component of said force component of said bearing counter-element.

7. The bearing element in accordance with claim 1, wherein said positioning segment is convex in the direction of said bearing counter-element.

8. The bearing element in accordance with claim 7, wherein said positioning segment is spherical in the direction of said bearing counter-element.

9. The bearing element in accordance with claim 1, wherein said bearing segment and said support elements are embodied in a single piece.

10. The bearing element in accordance with claim 1, wherein said positioning segment can be arranged adjacent to at least one selected from the group consisting of said lateral side wall and said back side wall and said positioning segment can be supported under stress.

11. An axial bearing for supporting a bearing counter-element, comprising:

a bearing element in accordance with claim 1; and a wall of a receiving opening of said bearing for fixing and/or orienting said bearing element in said bearing, said wall including said lateral side wall and said back side wall, wherein said bearing element is clamped with auto-orientation with said support elements in the lateral direction from the point of view of a force component of said hearing counter-element in the direction of said bearing element between said lateral side wall and/or said bearing element is clamped with auto-orientation in the support direction of said bearing counter-element between said bearing counter-element and said back side wall.

12. The axial bearing in accordance with claim 11, wherein said wall is at least one selected from the group consisting of a bore-shaped wall and a pot-shaped wall.

\* \* \* \* \*

UNITED STATES PATENT AND TRADEMARK OFFICE
CERTIFICATE OF CORRECTION

PATENT NO. : 7,677,806 B2  
APPLICATION NO. : 11/244400  
DATED : March 16, 2010  
INVENTOR(S) : Keven Moehring It is certified that error appears in the above-identified patent and that said Letters Patent is hereby corrected as shown below:

Column 8, Claim 1, Line 58  
Please delete "out"

Column 9, Claim 5, Line 22  
Please delete "are"  
and replace with --arc--

Column 9, Claim 5, Line 23  
Please delete "too"  
and replace with --to--

Signed and Sealed this

Eleventh Day of May, 2010

David J. Kappos  
*Director of the United States Patent and Trademark Office*